Figure 1:
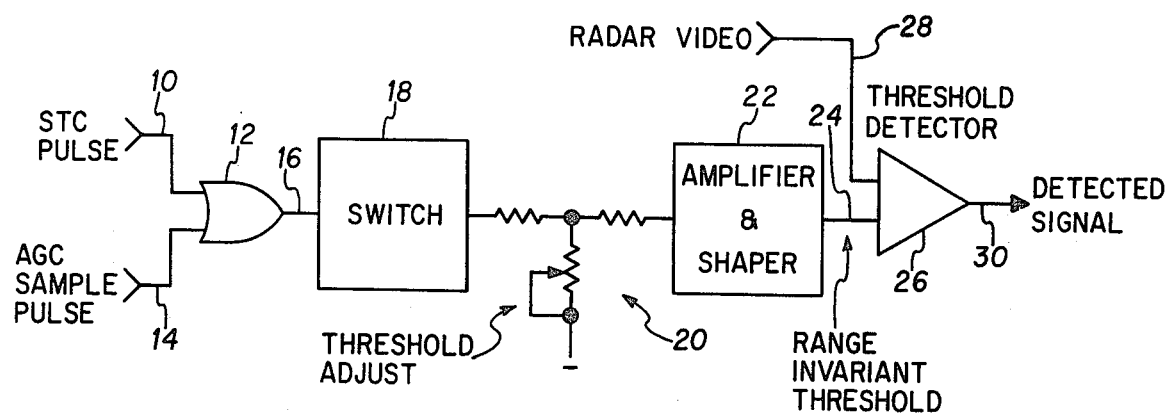

United States Patent [19]

Hooker, Jr.

[11] 4,169,263
[45] Sep. 25, 1979

[54] VARIABLE THRESHOLD SIGNAL DETECTING APPARATUS

[75] Inventor: Marvin L. Hooker, Jr., Marion, Iowa

[73] Assignee: Rockwell International Corporation, El Segundo, Calif.

[21] Appl. No.: 832,049

[22] Filed: Sep. 9, 1977

Related U.S. Application Data

[63] Continuation of Ser. No. 708,237, Jul. 23, 1976, abandoned.

[51] Int. Cl.² .............................................. G01S 7/34
[52] U.S. Cl. ............................................. 343/5 SM
[58] Field of Search ................................. 343/5 SM

[56] References Cited

U.S. PATENT DOCUMENTS

4,023,168  5/1977  Bruder et al. ............... 343/5 SM X

Primary Examiner—T. H. Tubbesing
Attorney, Agent, or Firm—Richard A. Bachand; Bruce C. Lutz; H. F. Hamann

[57] ABSTRACT

A variable threshold detecting circuit for use with radar signals where a given target will appear with the same intensity on the screen whether the target is nearby or far away. The $1/R^4$ decrease in amplitude of the returned radar signal is compensated for by discharging an integrating circuit and using the output voltage of the integrating circuit as the threshold to a threshold detector for passing only the radar signals exceeding the threshold.

1 Claim, 3 Drawing Figures

VARIABLE THRESHOLD SIGNAL DETECTING APPARATUS

This is a continuation, division, of application Ser. No. 708,237, filed July 23, 1976, now abandoned.

THE INVENTION

The present invention is generally related to electronics and more specifically related to a threshold detector whose threshold is varied in accordance with a characteristic of a signal being detected.

Weather avoidance is a primary purpose of weather radar and early detection of a severe storm provides maximum safety and fuel economy. When using normal present-day threshold detection techniques, a large target or severely contouring storm at a distant range may appear on a radar screen as a light storm. This presents a deceiving display to an airplane pilot since without manually adjusting the threshold level of the screen and using judgment obtained from years of flying, he cannot be sure whether this long range return signal is actually a light storm or a more severe storm falsely presented. If the pilot assumes that the storm presents no danger and continues on course, the true magnitude of the storm may only appear after the time for evasive action is less than optimum.

The method used at the present time in known operating equipment to increase sensitivity at longer ranges has been to adjust the threshold manually to a lower level. This increases the sensitivity for short ranges to a point where a light storm could provide an indication of a severe storm and thereby produce further false warnings.

D. Atlas recognizes this problem in column 7, line 59 of his U.S. Pat. No. 2,656,531. According to a very brief disclosure with no detail, his solution is to "amplify the echo power directly as the square of the target range." In Atlas' discussions the square of the target range must of necessity be amplified in a logarithmic amplifier in order to fit the known formulas regarding loss of signal strength over distance. It is well known, however, that for most applications there is not enough amplifier gain to accomplish an adequate job of presenting the return signal and thus all known operating units use a fixed gain. Even though the concept was presented by Atlas in 1950 in a patent which issued in 1953, such a disclosure has not been utilized.

The present inventive concept utilizes the recognition that it is necessary to have all echoes from equally intense storms appear at equal amplitudes on the radar scope regardless of range but accomplishes this objective through the concept of continuously varying the threshold amplitude as a function of range to account for free space and atmospheric attenuation such that a given intensity storm will appear the same on the display independent of the range. Since the contour level of a storm varies as an inverse of $R^4$ where R is the range, this nonlinear range factor can be compensated for by varying the threshold level exponentially. Thus, the present invention does not interfere with the amplification characteristics of the circuit and provides a system which will have a relatively constant signal-to-noise ratio rather than the varying signal-to-noise ratio which will plague a circuit based on the concept of Atlas where amplification is varied as a function of range.

It is, therefore, an object of the present invention to provide an improved threshold detector.

Figure 2:
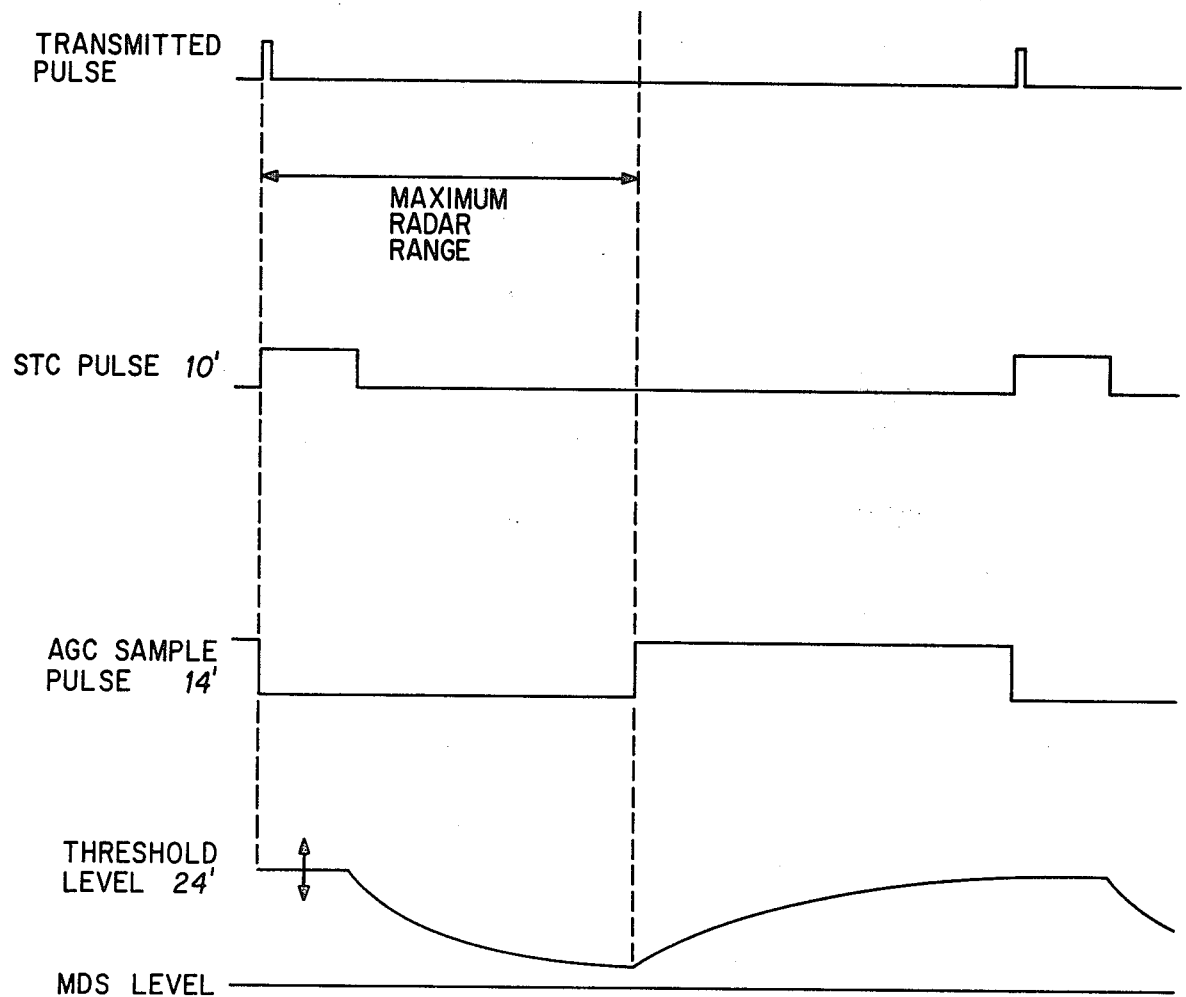
Figure 3:
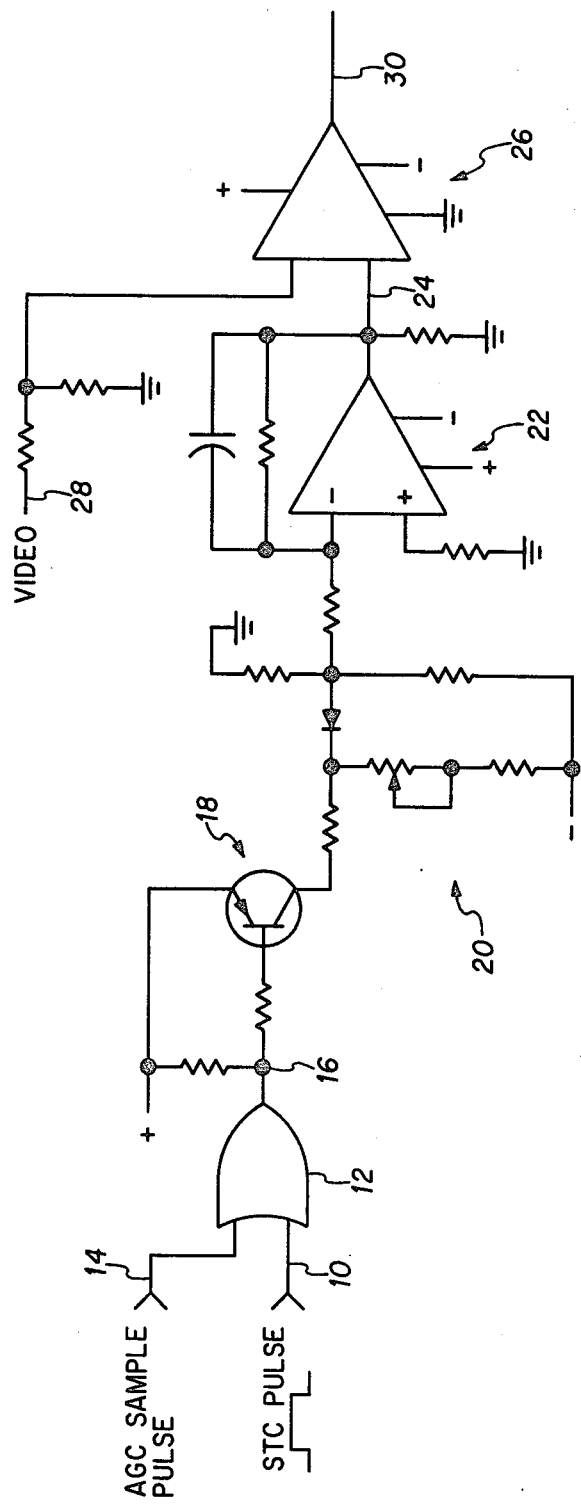

Other objects and advantages of the present invention will be apparent from a reading of the specification and appended claims in conjunction with the drawings wherein:

FIG. 1 is a block diagram of the inventive concept;

FIG. 2 comprises a plurality of waveforms used in explaining the operation of FIG. 1; and FIG. 3 comprises a detailed schematic diagram of the circuit of FIG. 1.

In FIG. 1, an STC or Sensitivity Time Control pulse, is applied on an input 10 to an OR gate 12 having an automatic gain control (AGC) sample pulse applied on a further input 14. An output of OR gate 12 is supplied on a lead 16 to a switch 18. A threshold adjust circuit generally designated as 20 is connected between switch 18 and an amplifier-shaper circuit 22 having an output supplied on lead 24 to a switching amplifier or threshold detector circuit 26. A radar video input signal is supplied on a lead 28 to a second signal input of threshold detector 26 while an output signal is supplied on a lead 30. In FIG. 2, a transmitted pulse used to initiate the return radar signals is diagrammatically illustrated as the first waveform in FIG. 2. The second waveform illustrates an STC pulse 10' while the third waveform illustrates an AGC pulse 14'. The threshold level waveform 24' is illustrative of the signal appearing on lead 24 and is illustrated using as a reference the minimum discernible signal (MDS) level which can be displayed on the display tube. The relative displacement of these two waveforms (24 and MDS) can be altered by adjusting the threshold adjust of circuit 20.

In FIG. 3 the same designators have been supplied to the components performing the same function as illustrated in FIG. 1.

OPERATION

In this description of operation, reference will be made to all three figures. From FIG. 2, it will be noted that the radar transmit pulse occurs simultaneous with the start of the STC pulse 10'. At this time, STC pulse 10' is in a logic 1 condition and is passed by the OR gate 12 to the transistor within switch 18. A logic 1 to this transistor will keep it in an OFF condition thereby allowing current flow from ground through the diode and the adjustable pot within the threshold adjust circuit 20. This keeps the voltage at the input to amplifier shaper 22 to a minimum value since the two resistors (the potentiometer and the parallel resistor) are in parallel. As will be noted from FIG. 2, the capacitor stays in a fully charged condition and thus the input on lead 24 to the threshold detecting amplifier remains in a maximum amplitude condition.

For informational purposes, it may be noted that in a preferred embodiment of the invention, the amplifier in block 22 is a commercially available P/N 1558, while the amplifier within threshold detector 26 had a commercial designation P/N 710. While the amplifier 22 does in fact perform a linear amplifying function, the device 26 operates more like a switch as soon as one of the inputs exceeds the value of the other input.

When the STC pulse falls to a logic 0, the AGC pulse 14' is also at a logic 0 thereby providing a logic 0 to the transistor within switch 18 and allowing current flow therethrough so that the transistor is turned to an ON condition. This back biases the diode within threshold adjust circuit 20 such that the voltage is raised at the input of the amplifier-shaper 22 and the capacitor is allowed to discharge. This discharge takes place over the rest of the radar range up to a given maximum point. At this time, the AGC sample pulse returns to a logic 1 level thereby turning off the transistor and again minimizing the input amplitude of the signal to shaper 22 and allowing the capacitor to recharge. At the end of the AGC sample pulse, another transmit pulse is provided and the cycle is repeated.

In accordance with the explanation provided at the beginning of this specification, it will be realized by those skilled in the art that after the STC pulse returns to a logic 0, the threshold, as applied to detector 26, is allowed to decay at a rate of 12 db per octave of range. This rate of decay is maintained until the threshold level nears the minimum discernible signal (MDS) level.

As previously explained, the advantage of this system is that a pilot can detect a severe storm at any range up to the maximum range of the radar and have the same display indication. This allows him more time to take evasive action and further provides him with more accurate information as to actual storm conditions throughout the radar range and area of search.

While I have described a specific embodiment of the inventive concept, I wish to be limited only by the teaching of the invention as claimed in the appended claims.

What is claimed is:

1. A threshold detection circuit for supplying an output in conjunction with a changing threshold over a predetermined time, indicative in time of range, after transmission of a radar pulse comprising, in combination;

means for supplying a radar video signal over the predetermined time;

means for supplying a sensitivity time control pulse of a first logic value immediately prior to said predetermined time;

means for supplying an automatic gain control sample pulse from the end of the pre-determined time until the commencement of the sensitivity time control pulse of the same logic value as said first logic value;

OR circuit means connected to receive the signals from said sensitivity time control pulse supplying means and said automatic gain control sample pulse supplying means and for providing an output when receiving said first logic value from one or the other;

switch means connected to receive the output signal from said OR circuit means and for providing an output signal in accordance therewith;

integrating circuit means, connected to receive the output signal from said switch means, said integrating circuit means providing a decreasing amplitude output signal whenever no signals of said first logic value are received by said OR circuit means;

differential comparator means including signal and threshold reference inputs for providing a switched output only when a signal supplied to said signal input exceeds the amplitude of a signal supplied to said reference input; and means connecting the supplied signal of said means for supplying a radar video signal to said signal input of said comparator means and further connecting an input of said integrating means to said reference input of said comparator means.

* * * * *